Aug. 9, 1932.  C. BERGQUIST  1,871,027
THIN BOILING STARCH AND METHOD OF MAKING SAME
Filed Aug. 6, 1928
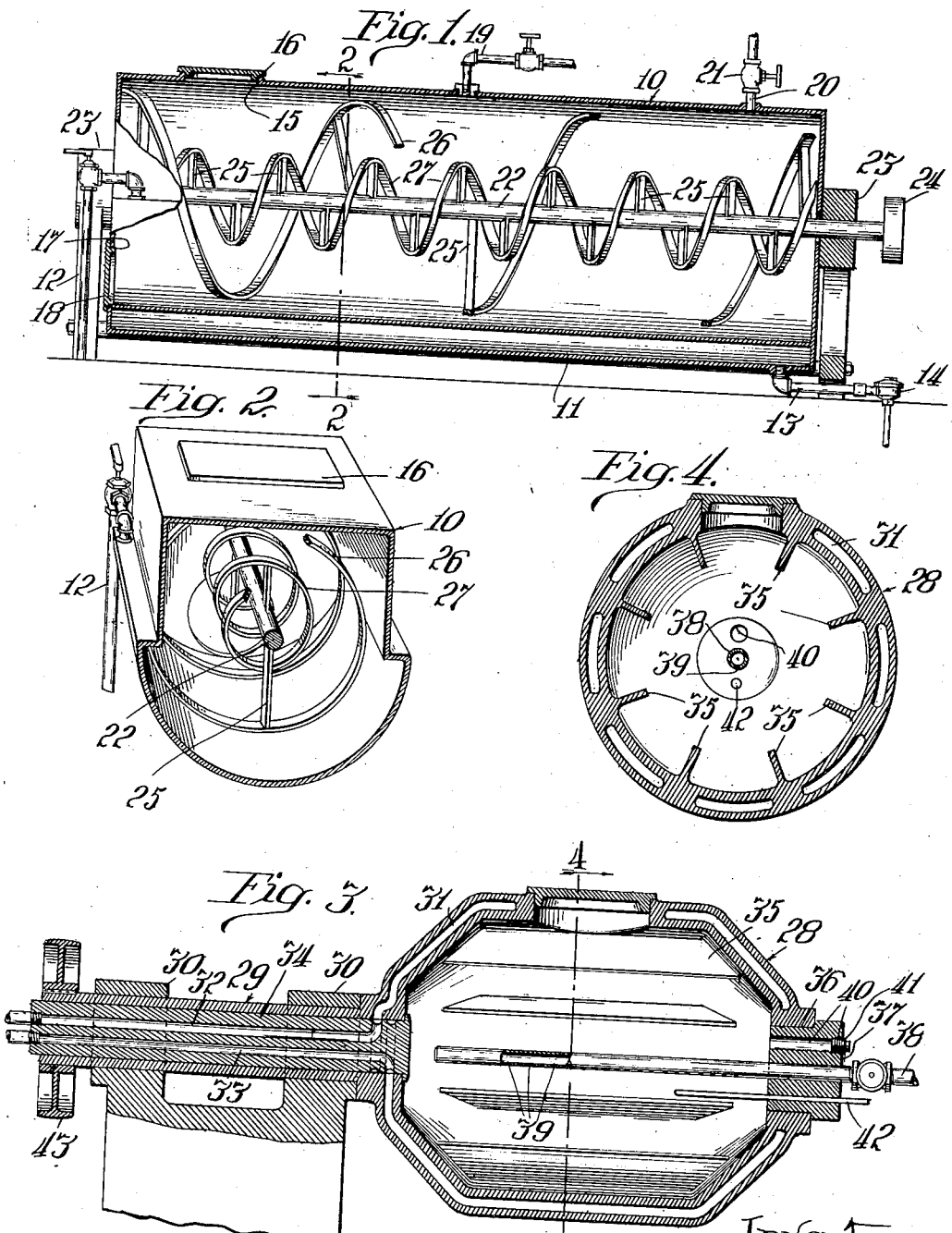

Patented Aug. 9, 1932

1,871,027

UNITED STATES PATENT OFFICE

CARL BERGQUIST, OF NEW YORK, N. Y., ASSIGNOR TO INTERNATIONAL PATENTS DEVELOPMENT COMPANY, OF WILMINGTON, DELAWARE, A CORPORATION OF DELAWARE

THIN BOILING STARCH AND METHOD OF MAKING SAME

Application filed August 6, 1928. Serial No. 297,613.

This invention relates to modified starches and methods of manufacturing the same by the use of anhydrous modifying agents particularly chlorine.

One of the objects of the invention is to provide a reaction product of starch and chlorine of relatively low solubility and which will be very uniformly colloidal in character when boiled with water.

Another object is to improve upon the method of chlorinating starch disclosed in the copending application of Carl Bergquist, filed August 3, 1927, Serial No. 210,325; these improvements consisting, generally speaking, in the use of lower temperatures and longer periods of treatment; in the employment of apparatus better calculated for insuring contact of the chlorine, which is used in very small quantities, with all of the starch; and in other novel procedural features to be hereinafter described and claimed.

In the drawing appended hereto are illustrated two types of apparatus suitable for practicing the instant method of chlorinating starch, one employing steam as a heating agent and the other oil.

In the drawing:

Fig. 1 is a longitudinal sectional view of the apparatus which is heated by steam.

Fig. 2 is a cross sectional view on line 2—2 of Fig. 1.

Fig. 3 is a longitudinal sectional view of the form of apparatus employing oil as heating agent, and Fig. 4 is a cross sectional view on line 4—4 of Fig. 3.

The apparatus as disclosed is intended to be purely illustrative. Other forms of apparatus might be employed.

Referring first to Figs. 1 and 2, 10 designates a vessel provided at the bottom with a steam jacket 11, supplied with steam through pipe 12, water of condensation being discharged from the jacket through pipe 13 provided with a steam trap 14. The vessel is provided on the top with an opening 15 for introducing the starch, this opening being closed during the chlorinizing operation by a cover plate 16. 17 is a discharge opening provided with a cover plate 18. 19 is a pipe for introducing the chlorine gas. The vessel may be provided with a vent pipe 20 having a valve 21, which is opened just wide enough to prevent the building up of a pressure in the vessel.

Extending through the vessel is a shaft 22 mounted in bearings 23—23 outside of the vessel and provided with a driving pulley 24. Secured to shaft 22 by means of struts 25 are two ribbon conveyors 26—27, one of which forms a right spiral and the other a left spiral, the spirals being of different diameters. Any other suitable means might be employed for turning over the starch so as to keep it in continual movement and agitation.

In Figs. 3 and 4 the vessel 28 is provided at one end with an elongated gudgeon 29 mounted in spaced bearings 30. The wall of the vessel is hollow, providing a space 31 for the circulation of oil, the oil entering space 31 by pipe 32 and being returned from the space by pipe 33, both of which pipes extend through a stationary bushing 34 arranged within gudgeon 29 which is hollow. The vessel may be provided on the inside with agitating blades 35. The end of the vessel opposite to the gudgeon 29 is formed with an opening 36 through which the starch may be introduced and discharged. This opening is closed by a closure 37 through which extends the chlorine pipe 38 formed, preferably, with a plurality of discharge ducts 39. The closure 37 is preferably perforated at 40 for a sampling stick, this perforation being ordinarily closed by a plug 41. A thermometer 42 extends through the closure 37. In this form of apparatus the distribution of the chlorine gas throughout the starch is effected by the tumbling action of the starch due to the rotation of the vessel, gudgeon 29 being provided with a driving pulley 43.

While steam may be used as a heating agent, either in the form of apparatus shown in Figs. 1 and 2 or in the form of apparatus shown in Figs. 3 and 4, the use of oil is to be preferred for the reason that with oil the temperature of the starch will be closer to the temperature of the heating agent and a more accurate temperature regulation made possible.

Apparently more complete contact of the chlorine with the starch is obtained by tumbling the starch in a rotary vessel, of the type shown in Figs. 3 and 4, than is possible by carrying on the treatment in a stationary vessel having a rotary agitator or mixer.

The method of chlorination is preferably as follows: the starch is first dried so as to have a moisture content not in excess of two per cent by weight. Air dry starch contains twelve or thirteen per cent of moisture due to the hygroscopicity of this substance. It is believed that of this twelve or thirteen per cent of water about 2 per cent is in chemical or molecular combination with the starch, the remainder being free moisture. The present invention contemplates removing all of the free moisture. Preferably, as a factor of safety, the starch is dried so that it will contain only about 1½ per cent of water. Whether or not the remaining moisture is chemically combined with the starch, the fact is that very different and less satisfactory results are obtained if the moisture content of the starch be substantially above 2 per cent.

The drying of the starch may be accomplished in the modifying vessel by providing suitable means for carrying off the vapors. Preferably, however, it is dried before being put into the modifying vessel, as for example in an ordinary dextrinizing vessel, which has provisions for eliminating the vapors, or in some other suitable form of drier. The dried starch is introduced into the vessel 10, or the vessel 28, and heated by the application of steam or heated oil to the vessels as described. When the apparatus of Figs. 1 and 2 is used, chlorine is introduced into the vessel 10 through pipe 19 and the shaft 22 is rotated. When the apparatus of Figs. 3 and 4 is employed the chlorine enters the vessel through pipe 38 and is distributed to the starch through the discharge openings 39, the vessel being rotated to bring about a thorough tumbling and agitation of the starch. The starch is maintained at a temperature between 105° C. and 120° C., the preferred temperature being 110° C. The amount of anhydrous chlorine gas used will vary from 0.02 per cent (by weight on the dry starch) to 0.06 per cent, depending upon the character of the starch. Ordinarily the whole period of treatment of the dried starch will be from 4 to 5 hours. As the temperature is increased the length of treatment will be decreased and vice versa. Similarly increasing the amount of chlorine will permit decrease in the temperature or in the length of time that the material is treated. However, these relationships are reciprocal only within rather narrow ranges as indicated, without affecting the character of the product. If too much chlorine is used the solubility of the product is increased. In fact by using chlorine up to 0.12 per cent it is possible to obtain by this process high soluble dextrines.

As a practical rule of procedure for producing a thin boiling starch having the characteristics mentioned the introduction of the chlorine is continued until a 5 gram sample when mixed with 10 cubic centimeters of water and 90 cubic centimeters of a one per cent solution of caustic soda will give a flow of 70 cubic centimeters in 70 seconds through what is known as a corn products funnel for testing fluidity. This funnel has an orifice which will pass 100 cubic centimeters of distilled water in 70 seconds. The temperatures of the liquids in all cases are at 25° C. A liquid which will give these results on test for fluidity is said to have a 5 gram fluidity of 70 cubic centimeters. When the reaction between the chlorine and the starch has reached such a point that the material has this 5 gram fluidity of 70 cubic centimeters the introduction of chlorine into the starch is stopped and the agitation of the starch continued with the application of heat as before until a sample shows a 30 gram fluidity of from 1½ to 5 cubic centimeters, depending upon the particular fluidity desired. This means that when 30 grams of the starch is mixed with 45 cubic centimeters of water and 30 cubic centimeters of 10 per cent caustic soda, an amount of the mixture which will be somewhere between 1½ and 5 cubic centimeters will flow through the corn products funnel in 70 seconds. At the present time commercial considerations require manufacture of products having two fluidities, a thick starch of 2 cubic centimeters fluidity and a thin starch of 4 cubic centimeters fluidity. When the sample indicates the desired fluidity—whatever that may be—the reaction is stopped as quickly as possible, for example, by emptying the contents of the vessel into a water jacketed cooler to reduce the temperature of the product to 82° C. or below. The product will ordinarily have an acidity of from pH=3.8 to pH=4.0. Its solubility will be as indicated above. From 2 to 4 per cent of the product will be soluble in water at 25° C. Ordinarily a 2 cubic centimeter fluidity product will have a solubility of 2 per cent to 2½ per cent and the 4 cubic centimeter fluidity product, a solubility of from 3 per cent to 3½ per cent. In order that the product may not swell and burst the containers because of its hygroscopic character, it is desirable to add moisture to it. This may be done by spraying the product with water. The product may be neutralized in any suitable manner, for example, by adding an alkali to the spray water. The product in addition to having the characteristics as noted may be characterized in that when one part by weight is boiled with nine parts by water the starch will not separate out on cooling; and, further, in that when one part of starch is boiled with three parts of water and the paste cooled and three parts of china clay mixed with it, the paste will hold all of the clay in colloidal suspension. The starch thus treated is very uniformly colloidal when in the form of a paste. In this respect it is much superior to starch which has been modified by the method of acid hydrolysis. The product resembles more nearly starch which has been modified by the use of alkaline oxidizers, sodium hypochlorite for example; but the process of treatment with chlorine gas is a much simpler, cheaper, and more convenient process than the wet alkali oxidizing process, which latter necessitates the use of large quantities of hypochlorite that is very disagreeable and inconvenient to handle, and involves considerable difficulties in drying due to the tendency of the material to lump.

The reaction, whatever it may be, is distinctly different from that which takes place when starch is heated in contact with a dilute acid, hydrochloric acid for example. In that reaction the hydrochloric acid acts merely as a catalyzer to produce hydrolization of the starch. All the acid is driven off when the conversion is complete. When starch, dried to remove all of its free moisture, or at least dried so that 2 per cent of water or less remains in the starch, is heated to temperature substantially above 105° C. in the presence of an anhydrous chlorine (these conditions making impossible the formation of any appreciable amount of hydrochloric acid) the chlorine reacts directly upon and combines with the starch, since it disappears in the reaction and is not subsequently recovered. Apparently the chlorine breaks up the larger starch molecules or aggregates of molecules, into smaller molecules or aggregates. If the operation is prolonged and carried out at relatively low temperatures, that is within the range of temperatures specified above, and the starch is continuously agitated so that the chlorine comes into contact with substantially all of the starch, the breaking up of the larger aggregates into smaller aggregates is accomplished with considerable uniformity which is probably the reason why the product has the characteristic of being uniformly colloidal which experience shows that it does have. Whether this theory is correct or not, the dry process employing an anhydrous gas and using starch containing less than 2 per cent of water, gives a uniform product comparable to the alkaline-oxidizer made soluble starches, a product which differs quite radically in this respect from starch that has been modified by the process of acid hydrolysis which latter process, as is well known, results in having to a greater or less extent the whole series of conversion products from soluble starch to dextrose in the modified starch product. In short, the action of an anhydrous gas on starch containing no free moisture is quite different from the action of an acid in the presence of moisture, and gives a different product. The principle is of general application. One can modify starch by heating it in a dried state in contact with anhydrous hydrochloric acid (HCl) but to obtain a reaction the temperature must be in the neighborhood of 150° C.

I claim:
1. Method of modifying starch which comprises heating starch containing not more than two per cent of water in the presence of from 0.02 per cent to 0.06 per cent of anhydrous chlorine, by weight on the dry starch maintained in uniform distribution through the starch, at temperatures within the range of from 105° C. to 120° C. until the product has a 30 gram fluidity of from 1½ to 5 cubic centimeters when subjected to the hereinabove described fluidity test.

2. Method of modifying starch which comprises heating starch containing not more than two per cent of water in the presence of from 0.02 per cent to 0.06 per cent of anhydrous chlorine, by weight on the dry starch maintained in uniform distribution through the starch, at temperatures within the range of from 105° C. to 120° C. for from four to five hours.

3. Method of modifying starch which comprises introducing anhydrous chlorine into starch, dried to contain not substantially more than two per cent of water, and heating the starch to a temperature within the range of 105° C. to 120° C. to effect reaction with the chlorine while maintaining the same in agitation to bring about uniform distribution of the chlorine in the starch, the chlorine introduced being from 0.02% to 0.06% by weight of the dry starch, then stopping the introduction of chlorine and maintaining the high temperature and continuing the agitation until the product has a 30 gram fluidity of from 1½ to 5 cubic centimeters.

4. Method of modifying starch which comprises introducing into starch, dried to contain not substantially more than two per cent of water, anhydrous chlorine of from 0.02 per cent (by weight on the dry starch) to 0.06 per cent, heating the starch to a temperature within the range of 105° C. to 120° C. to effect reaction with the chlorine while maintaining the starch in agitation to bring about uniform distribution of the chlorine in the starch, stopping the introduction of chlorine when the material has a 5 gram fluidity of 70 cubic centimeters, in accordance with the hereinabove described fluidity test, and maintaining the high temperature and continuing the agitation until the desired fluidity is obtained.

5. Method of modifying starch which comprises introducing anhydrous chlorine into starch, dried to contain not substantially more than two per cent of water, and heating the starch to a temperature within the range of 105° C. to 120° C. to effect reaction with the chlorine while maintaining the starch in agitation to bring about uniform distribution of the chlorine in the starch, the chlorine introduced being in sufficiently small quantities to combine completely with the starch without hydrolytic action, stopping the introduction of chlorine when the material has a 5 gram fluidity of 70 cubic centimeters, in accordance with the hereinabove described fluidity test, and maintaining the high temperature and continuing the agitation until a 30 gram fluidity of from 1½ to 5 cubic centimeters is obtained.

6. Method of modifying starch which comprises introducing from 0.02 per cent to 0.06 per cent by weight of anhydrous chlorine into starch dried to contain not substantially more than two per cent of water while heating the starch to a temperature within the range of 105° C. to 120° C. and keeping the starch in agitation to bring about uniform distribution of the chlorine in the starch, then stopping the introduction of chlorine and maintaining substantially the same temperature and continuing the agitation until a product of the desired fluidity is obtained.

7. Method of modifying starch which comprises introducing from 0.02 per cent to 0.06 per cent of chlorine into starch dried to contain not substantially more than two per cent of water while agitating the starch and heating it to a temperature within the range of 105° C. to 120° C., stopping the introduction of chlorine when the product has reached a 5 gram fluidity of 70 cubic centimeters, in accordance with the hereinabove described fluidity test and maintaining substantially the same temperature and continuing the agitation until the product has a 30 gram fluidity of from 1½ cubic centimeters to 5 cubic centimeters.

8. Method of modifying starch which comprises drying the starch until it contains not substantially more than 2% of water, heating the same for a period of from 2 to 5 hours in the presence of from 0.02 per cent to 0.06 per cent anhydrous chlorine maintained in uniform dispersion throughout the starch to a temperature to bring about chemical reaction between the chlorine and the starch, and spraying the product with water to increase the water content to that of air dry starch.

9. Method of modifying starch which comprises heating the starch, deprived of substantially all of its free moisture, in the presence of an anhydrous gas containing chlorine in quantities of from 0.02% to 0.06% by weight on the starch for a period of from 2 to 5 hours to a temperature to bring about reaction between said agent and the starch while maintaining agitation of the starch to bring about substantially uniform dispersion of the agent throughout the starch.

10. Method of modifying starch which comprises heating the starch deprived of substantially all of its free moisture in the presence of from 0.02 per cent (by weight of the dry starch) to 0.06 per cent anhydrous chlorine for a period of from 2 to 5 hours to a temperature to bring about reaction between said chlorine and the starch, while agitating the starch to effect a substantially uniform dispersion of the chlorine throughout the starch.

CARL BERGQUIST.